(12) United States Patent
Thompson (10) Patent No.: US 11,111,008 B2
(45) Date of Patent: Sep. 7, 2021

(54) AIRCRAFT LANDING GEAR SPRING ASSEMBLY

(71) Applicant: Airbus Operations Limited, Bristol (GB)

(72) Inventor: Robert Ian Thompson, Bristol (GB)

(73) Assignee: Airbus Operations Limited, Bristol (GB)

(*) Notice: Subject to any disclaimer, the term of this patent is extended or adjusted under 35 U.S.C. 154(b) by 299 days.

(21) Appl. No.: 16/199,952

(22) Filed: Nov. 26, 2018

(65) Prior Publication Data

US 2019/0161177 A1    May 30, 2019

(30) Foreign Application Priority Data

Nov. 27, 2017    (GB) ..................................... 1719671

(51) Int. Cl.
*B64C 25/62*    (2006.01)

(52) U.S. Cl.
CPC .................... *B64C 25/62* (2013.01)

(58) Field of Classification Search
CPC ............. B64C 25/62; B64C 2025/006; B64C 2025/008
See application file for complete search history.

(56) References Cited

U.S. PATENT DOCUMENTS

| | | | |
|---|---|---|---|
| 2,959,410 A | 11/1960 | Fullam et al. | |
| 3,042,345 A | 7/1962 | Holland, Jr. | |
| 4,593,890 A | 6/1986 | Van Der Laarse | |
| 9,796,468 B2* | 10/2017 | Thompson | B64C 25/58 |
| 2009/0109771 A1 | 4/2009 | Cox et al. | |
| 2011/0155845 A1 | 6/2011 | Nannoni et al. | |
| 2016/0023750 A1 | 1/2016 | Thompson | |

FOREIGN PATENT DOCUMENTS

| | | |
|---|---|---|
| CA | 2 823 082 | 3/2014 |
| CN | 206068141 | 4/2017 |
| EP | 0 299 588 | 1/1989 |
| EP | 0435143 | 7/1991 |
| EP | 2 252 507 | 2/2012 |

(Continued)

OTHER PUBLICATIONS

M. Chun-Yung Niu, "Airframe Structural Design", (1988), p. 433 (from NPL document).

(Continued)

*Primary Examiner* — Assres H Woldemaryam
(74) *Attorney, Agent, or Firm* — Nixon & Vanderhye P.C.

(57) ABSTRACT

A spring assembly 100 for aircraft landing gear 10 including: an interface 110 via which the spring assembly 100 is attachable to a support 1a; a loading point 120 for receiving a load from one or more wheels 150 or skids in use, wherein the loading point 120 is movable relative to the interface 110; a spring system 130 that is configured to apply a resilient biasing force to the loading point 120 to oppose movement of the loading point 120 relative to the interface 110. The spring system 130 is configured so that, during application of an increasing load to the loading point 120 against the resilient biasing force of the spring system 130, a spring rate of the spring system 130 changes from a first spring rate k1 to a second spring rate k2, the second spring rate k2 being less than the first spring rate k1.

14 Claims, 5 Drawing Sheets

(56) References Cited

FOREIGN PATENT DOCUMENTS

| | | | | |
|---|---|---|---|---|
| EP | 2977316 | | 1/2016 | |
| FR | 2 185 537 | | 1/1974 | |
| GB | 308950 | | 4/1929 | |
| GB | 355348 A | * | 8/1931 | ............ B64C 25/62 |
| GB | 806824 | | 12/1958 | |
| GB | 878385 | | 9/1961 | |
| GB | 901447 | | 7/1962 | |
| GB | 2271747 A | * | 4/1994 | ............ B60T 1/065 |
| GB | 2528498 | | 1/2016 | |
| JP | 7-52892 | | 2/1995 | |
| WO | 94/08806 | | 4/1994 | |
| WO | 2009/109771 | | 9/2009 | |

OTHER PUBLICATIONS

Nui, Airframe Structural Design (Chap. 12 Landing Gears), Lockheed Aeronautical Systems Company, Conmilit Press, Ltd., pp. 430-470 (1995).

* cited by examiner

AIRCRAFT LANDING GEAR SPRING ASSEMBLY

RELATED APPLICATION

This application claims priority to United Kingdom Patent Application GB1719671-8 filed 27 Nov. 2017, the entire contents of each of which is hereby incorporated by reference.

TECHNICAL FIELD

The present invention relates to aircraft landing gear, and particularly to spring assemblies and suspension systems for aircraft landing gear.

BACKGROUND

Some conventional sprung landing gears comprise oleo-pneumatic landing gear shock absorbers. The load/deflection characteristics that are achievable with such mechanisms are inherently limited. The shape of the spring curve is set by Gas Laws. Typically, this results in an initially flat load/stroke relationship, with the gradient of the curve rapidly rising towards the end of travel. A significant load can be required on the wheels before the shock absorber "breaks out" and begins to compress.

The natural linear load/deflection characteristics of landing gears based on mechanical leaf spring designs can be modified slightly, such as by variance of the cross-section of the part of the leaf spring that bends in use, but essentially the spring characteristics follow Hooke's Law.

There is a need for mechanisms for use in landing gears that offer alternative load/deflection characteristics.

SUMMARY

A first aspect of the present invention provides a spring assembly for aircraft landing gear, the spring assembly comprising: an interface via which the spring assembly is attachable to a support; a loading point for receiving a load from one or more wheels or skids in use, wherein the loading point is movable relative to the interface; and a spring system that is configured to apply a resilient biasing force to the loading point to oppose movement of the loading point relative to the interface; wherein the spring system is configured so that, during application of an increasing load to the loading point against the resilient biasing force of the spring system, a spring rate of the spring system changes from a first spring rate to a second spring rate, the second spring rate being less than the first spring rate.

By providing that the second spring rate is less than the first spring rate, the spring assembly may be configured to be well-suited to meeting different demands in use. For example, the first spring rate may be sufficient to help get a load onto the wheel(s) or skid(s) during a landing procedure, which can help improve braking drag and, in the case when wheel(s) are used in place of skid(s), help to avoid skidding. On the other hand, the second, lower spring rate can thereafter help provide a soft ride characteristic.

Optionally, the spring system is configured so that, as the load applied to the loading point against the resilient biasing force of the spring system is further increased, the spring rate of the spring system changes from the second spring rate to a third spring rate, the third spring rate being greater than the second spring rate.

By providing that the third spring rate is greater than the second spring rate, the spring assembly may be configured to help react high-descent-rate landings. Alternatively or additionally, the higher third spring rate may help to improve lateral stability when the aircraft to which the landing gear is mounted is taxiing or otherwise turning on the ground.

Optionally, the third spring rate is substantially equal to the first spring rate.

Optionally, the spring system comprises a first spring element and a second spring element, and a spring rate of the second spring element is less than a spring rate of the first spring element.

Optionally, the loading point is connected to the second spring element via the first spring element.

Optionally, the spring assembly comprises a support structure, the first spring element is rotationally mounted to the support structure at a first pivot between first and second end portions of the first spring element, the first end portion of the first spring element comprises the loading point, and the second end portion of the first spring element is coupled to the second spring element.

Optionally, the support structure has a first stop that is configured to limit rotation of the second end portion of the first spring element about the first pivot during application of the load to the loading point.

Optionally, the second spring element is configured to apply a preload to the second end portion of the first spring element to bias the second end portion of the first spring element away from the first stop.

Optionally, the support structure has a second stop, and the first stop and the second stop are configured to limit an angular range of rotation of the second end portion of the first spring element about the first pivot.

Optionally, the first spring element comprises a leaf spring.

Optionally, the second spring element comprises a leaf spring.

A second aspect of the present invention provides a suspension system for aircraft landing gear, the suspension system comprising: a loading point for receiving a load from one or more wheels or skids; and a spring mechanism configured to oppose movement of the loading point; wherein the spring mechanism is configured so that, during application of an increasing load to the loading point, a spring rate of the spring mechanism changes from a first spring rate to a second spring rate and then to a third spring rate, the second spring rate being less than each of the first and third spring rates.

The second spring rate being less than each of the first and third spring rates means that the suspension system may be configured to be well-suited to meeting different demands in use, similarly to as discussed above.

The suspension system of the second aspect of the present invention may have any or all the features described above as optional in the spring assembly of the first aspect of the present invention.

The suspension system may comprise an interface via which the suspension system is attachable to a support, wherein the loading point is movable relative to the interface, and wherein the spring mechanism is configured to apply a resilient biasing force to the loading point to oppose movement of the loading point relative to the interface.

A third aspect of the present invention provides a kit of parts for assembling into the spring assembly of the first aspect of the present invention, or for assembling into the suspension system of the second aspect of the present invention.

A fourth aspect of the present invention provides aircraft landing gear comprising at least one spring assembly according to the first aspect of the present invention, or comprising at least one suspension system according to the second aspect of the present invention.

A fifth aspect of the present invention provides an aircraft comprising at least one aircraft landing gear according to the fourth aspect of the present invention.

BRIEF DESCRIPTION OF THE DRAWINGS

Embodiments of the invention will now be described, by way of example only, with reference to the accompanying drawings, in which.

DETAILED DESCRIPTION

Figure 1:
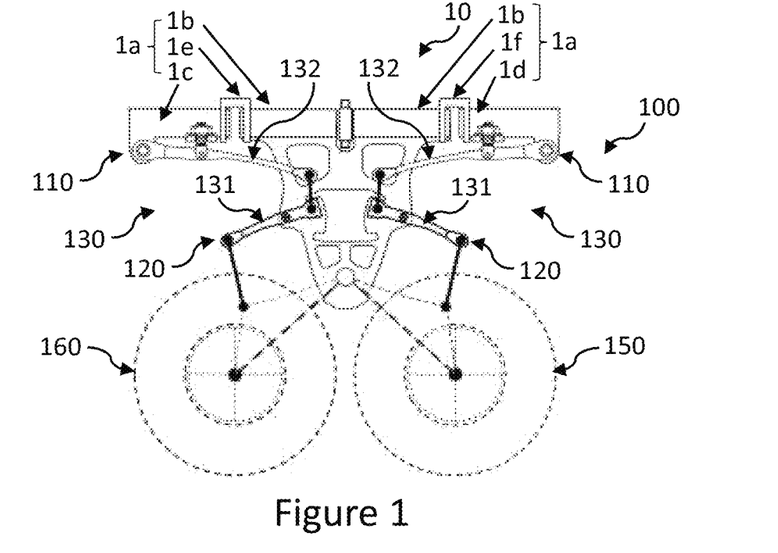
FIG. 1 shows a schematic cross-sectional side view of an example of an aircraft landing gear according to an embodiment of the present invention.
Figure 2:
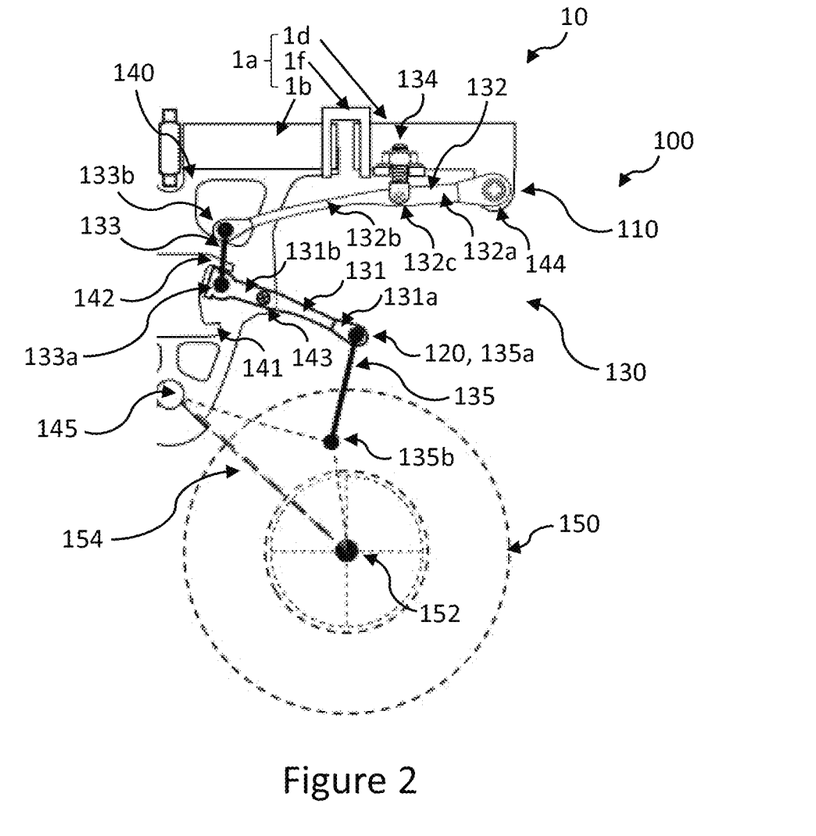
FIG. 2 shows a partial schematic cross-sectional side view of the aircraft landing gear of FIG. 1.

Referring to FIGS. 1 and 2, there are shown a schematic cross-sectional side view and a partial schematic cross-sectional side view of an example of an aircraft landing gear according to an embodiment of the invention. The aircraft landing gear 10 comprises two example spring assemblies 100, and each of the spring assemblies 100 is itself according to an embodiment of the invention. In some embodiments, each of the spring assemblies 100 is considered a suspension system for aircraft landing gear.

In some embodiments, a landing gear may comprise only one spring assembly, or more than two spring assemblies, embodying the present invention. In some embodiments, one or more of the spring assemblies 100 may be provided in isolation from the rest of the landing gear 10. In some embodiments, one or more of the spring assemblies 100 may be provided as a kit of parts for assembling into the one or more spring assemblies 100.

For brevity, the discussion below relates primarily to only the right-hand (as illustrated) one of the two spring assemblies 100 of the landing gear 10 shown in FIG. 1. However, it will be appreciated from consideration of FIG. 1 that the left-hand (as illustrated) one of the two spring assemblies 100 has a corresponding construction and is effectively a mirror image of the right-hand spring assembly 100.

The landing gear 10 comprises a support 1a via which the landing gear 10 is connectable to an aircraft, such as the aircraft 1 shown in FIG. 9 and described in more detail below. In this embodiment, the support 1a comprises first, second and third parts 1b, 1c, 1d. The second and third parts 1c, 1d are fore and aft, respectively, of the first part 1b, and are rotationally connected to the first part 1b by rotational links 1e, 1f. The support structure 140 described below is integral with, or attached to, the first part 1b of the support 1a. The first part 1b of the support 1a takes part of the vertical ground load and all of the torsional ground load applied to the spring assemblies 100 of the landing gear 10. The second and third parts 1c, 1d include respective lugs to which the second spring elements 132 of the landing gear 10 are connected. The second and third parts 1c, 1d of the support 1a react vertical loads from the respective spring assemblies 100 and the respective preload applicators 134 (described below), but do not react torsional ground loads. The first, second and third parts 1b, 1c, 1d all lie on the same axis, which passes through the centres of the rotational links 1e, 1f, and rotate about that axis during retraction and extension of the landing gear 10. There may also be a sidestay assembly (not shown) attached to the first part 1b of the support 1a. The sidestay assembly is for reacting lateral loads on the landing gear 10 and may be used to maintain the landing gear 10 in an extended position. In other embodiments, the support 1a may take a different form to that of this embodiment.

The spring assembly 100 comprises an interface 110 via which the spring assembly 100 is attachable to the support 1a. In this embodiment, and as discussed above, the support 1a is part of an aircraft landing gear 10. However, in other embodiments, the support may be another aircraft component, such as a fuselage. In this embodiment, the interface 110 comprises a hole in an end region of a second spring element 132 of the spring assembly 100, which second spring element 132 will be described in more detail below. In use, a fastener such as a bolt is passed through the hole and through a corresponding hole in the lug of the third part 1d of the support 1a. However, in other embodiments, the interface could take a different form. For example, the interface may comprise one or more devices for attaching the spring assembly 100 to the support. Example such devices are clamps, bolts, and captured nuts for receiving bolts. In some embodiments, the interface may be free from such a device, and may be held (such as clamped) by the support. Other forms of interface could be employed in still further embodiments.

The spring assembly 100 also comprises a loading point 120 for receiving a load from one or more wheels or skids in use. The load may be a ground load. In this embodiment, the landing gear 10 comprises a pair of wheels or wheelsets 150, 160 (shown as a ghosted representation in the Figures). A first 150 of the wheels or wheelsets is for applying a load to the loading point 120 of the right-hand one of the two spring assemblies 100 of the landing gear 10, as shown in FIGS. 1 and 2, and a second 160 of the wheels or wheelsets is for applying a load to the loading point 120 of the left-hand one of the two spring assemblies 100 of the landing gear 10, as shown in FIG. 1. One of the wheels or wheelsets, such as the first 150 of the wheels or wheelsets, may be a trailing wheel or wheelset of the landing gear 10, and the other of the wheels or wheelsets, such as the second 160 of the wheels or wheelsets, may be a leading wheel or wheelset of the landing gear 10.

In some embodiments, the landing gear may comprise only one wheel or wheelset, and one associated spring assembly 100 with a loading point 120 for receiving a load from the one wheel or wheelset. For example, an embodiment of a landing gear or spring assembly may comprise only those components that are visible in FIG. 2. In some embodiments, the landing gear may comprise plural wheels or wheelsets, and a spring assembly 100 with a loading point 120 for receiving a load from the plural wheels or wheelsets.

The loading point 120 in this embodiment is part of a first end portion 131a of a first spring element 131 of the spring assembly 100, which first spring element 131 will be described in more detail below. In other embodiments, the loading point 120 may be part of a different component of the spring assembly 100.

The loading point 120 is movable relative to the interface 110. The spring assembly 100 comprises a spring system or spring mechanism 130 that is configured to apply a resilient biasing force to the loading point 120 to oppose movement of the loading point 120 relative to the interface 110. In this embodiment, the loading point 120 is movable towards and away from the interface 110, and the spring system or spring mechanism 130 is configured to apply a resilient biasing force to the loading point 120 to oppose movement of the loading point 120 towards the interface 110.

As will be described and better understood from the further description below, in this embodiment the spring system 130 is configured so that, during application of an increasing load to the loading point 120 against the resilient biasing force of the spring system 130, a spring rate of the spring system 130 changes from a first spring rate to a second spring rate, the second spring rate being less than the first spring rate. The first spring rate can therefore be a relatively moderate spring rate for getting load onto the wheel(s) (or skid(s), when present), which can help lessen or avoid skidding and to help improve braking drag. The second, lower spring rate can thereafter help provide a soft ride characteristic. In this embodiment, the movement of the loading point 120 is towards the interface 110 during application of the increasing load to the loading point 120, such as during a landing procedure or event.

Furthermore, as will also be described and better understood from the further description below, in this embodiment the spring system 130 is configured so that, as (or if) the load applied to the loading point 120 against the resilient biasing force of the spring system 130 is further increased, the spring rate of the spring system 130 changes from the second spring rate to a third spring rate, the third spring rate being greater than the second spring rate. This third spring rate can help to react high-descent-rate landings, and/or may help to improve lateral stability when the aircraft to which the landing gear is mounted is taxiing or otherwise turning on the ground. In this embodiment, the third spring rate is equal, or substantially equal, to the first spring rate. However, in other embodiments, the third spring rate may be less than or greater than the first spring rate. Moreover, in some embodiments, the spring rate of the spring system 130 may not change from the second spring rate to a third, greater spring rate as the load applied to the loading point 120 is further increased.

The spring system 130 of this embodiment comprises a first spring element 131 and a second spring element 132. In this embodiment, each of the first and second spring elements 131, 132 comprises a leaf spring. Use of leaf springs can enable the spring system 130 to begin to compress as soon as a load is applied to the loading point 120. That is, the spring system 130 may be considered to have a zero, or substantially zero, break-out load. This can facilitate weight-on-wheels detection, such as to determine whether the landing gear 10 (and the aircraft 1 to which it is mounted) has landed. In some embodiments, one or each of the first and second spring elements 131, 132 may comprise a composite spring. By composite spring, it is meant a spring made from a combination of materials, such as metal and carbon. In some other embodiments, one or each of the first and second spring elements 131, 132 may be made from a single material, such as a single metal or metal alloy. In some embodiments, the first spring element 131 could comprise a bell crank, with the first and second end portions 131a, 131b forming the arms of the bell crank.

A spring rate of the second spring element 132 is less than a spring rate of the first spring element 131. As will become clear from the following description, in this embodiment it is this difference in these spring rates that enables the spring system 130 to demonstrate the above spring rate characteristics during application of the increasing load to the loading point 120. However, in other embodiments, the spring system 130 may take a different form to that of the present embodiment and yet still demonstrate the above spring rate characteristics during application of the increasing load to the loading point 120. For example, in some embodiments, a controller may be provided for dynamically mechanically adjusting elements of the spring system 130 during the application of the increasing load to the loading point 120.

In this embodiment, and as indicated in FIG. 2, the spring assembly 100 comprises a support structure 140. The first spring element 131 is rotationally mounted to the support structure 140 at a first pivot 143. The first pivot 143 is located between first and second end portions 131a, 131b of the first spring element 131. The first end portion 131a of the first spring element 131 is that which comprises the loading point 120. The second end portion 131b of the first spring element 131 is coupled to the second spring element 132. As a result, the loading point 120 is connected to the second spring element 132 via the first spring element 131.

In this embodiment, the first end portion 131a of the first spring element 131 is a sprung or resilient part of the first spring element 131, whereas the second end portion 131b of the first spring element 131 is relatively rigid and either does not act as a spring or is less resilient or elastic than the first end portion 131a of the first spring element 131. This difference in characteristics between the first and second end portions 131a, 131b of the first spring element 131 may be achieved through appropriate selection of relative geometry and/or materials of the first and second end portions 131a, 131b, for example. In this embodiment, the first end portion 131a of the first spring element 131 is longer than the second end portion 131b of the first spring element 131, but in other embodiments the opposite may be true or the first and second end portions 131a, 131b may be of the same, or substantially the same, length.

In this embodiment, the first spring element 131 is coupled to the second spring element 132 via a link 133. A first end 133a of the link 133 is pivotally coupled to the second end portion 131b of the first spring element 131, and a second end 133b of the link 133 is pivotally coupled to the second spring element 132. In other embodiments, the link 133 may be omitted. In some such embodiments, the second end portion 131b of the first spring element 131 may be pivotally coupled to the second spring element 132.

The support structure 140 of this embodiment has a first stop 141 and a second stop 142. The first and second stops 141, 142 are configured to limit an angular range of rotation of the second end portion 131b of the first spring element 131 about the first pivot 143. That is, the first and second stops 141, 142 determine the angle over which the second end portion 131b of the first spring element 131 is able to rotate about the first pivot 143. The first stop 141 is configured to limit rotation of the second end portion 131b of the first spring element 131 about the first pivot 143 during the application of the increasing load to the loading point 120. The second stop 142 is configured to limit rotation of the second end portion 131b of the first spring element 131 about the first pivot 143 during removal or reduction of the load.

One end of the second spring element 132 is rotationally mounted to the support structure 140 at a second pivot 144. In other embodiments, the second spring element 132 may be mounted or attached to the support structure 140 in a non-pivotal manner. For example, the second spring element 132 may be clamped in position relative to the support structure 140.

The spring system 130 of this embodiment includes a preload applicator 134. The preload applicator 134, which may be for example an adjustment screw, is for applying a preload to the second spring element 132 to cause the second spring element 132 to move away from its rest state. The preload is applied to the second spring element 132 at a point 132c between first and second end portions 132a, 132b of the second spring element 132. The first end portion 132a of the second spring element 132 is that which is mounted to the support structure 140 as described above. The second end portion 132b of the second spring element 132 is coupled to the second end portion 131b of the first spring element 131 via the link 133. That is, the second end 133b of the link 133 is pivotally coupled to the second end portion 132b of the second spring element 132. The second spring element 132 is configured to apply the preload to the second end portion 131b of the first spring element 131, to bias the second end portion 131b of the first spring element 131 away from the first stop 141 of the support structure 140. That is, the increasing load applied to the loading point 120 from the wheel 150 is such as to encourage rotational movement of the first spring element 131 about the first pivot 143 in a first rotational direction, whereas the preload biases the first spring element 131 to move in a second rotational direction about the first pivot 143, opposite to the first rotational direction.

In a variation to the illustrated embodiment, the locations of the second pivot 144 and the point 132c of application of the preload to the second spring element 132 may be swapped. That is, the second pivot 144 may be located between the first and second end portions 132a, 132b of the second spring element 132, and the preload may be applied to a point in the first end portion 132a of the second spring element 132 to bias the second spring element 132 to rotate about the second pivot 144 in such a manner as to bias the second end portion 131b of the first spring element 131 away from the first stop 141 of the support structure 140.

In this embodiment, the second end portion 132b of the second spring element 132 is a sprung or resilient part of the second spring element 132, whereas the first end portion 132a of the second spring element 132 is relatively rigid and either does not act as a spring or is less resilient or elastic than the second end portion 132b of the second spring element 132. Again, this difference in characteristics between the first and second end portions 132a, 132b of the second spring element 132 may be achieved through appropriate selection of relative geometry and/or materials of the first and second end portions 132a, 132b, for example. In this embodiment, the first end portion 132a of the second spring element 132 is shorter than the second end portion 132b of the second spring element 132, but in other embodiments the opposite may be true or the first and second end portions 132a, 132b may be of the same, or substantially the same, length.

As discussed above, the second stop 142 of the support structure 140 helps to control movement of the first spring element 131 about the first pivot 143 during removal or reduction of the load applied to the loading point 120 from the wheel 150. However, in some embodiments, the second stop 142 may be omitted. In those embodiments, rotation of the second end portion 131b of the first spring element 131 about the first pivot 143 during removal or reduction of that load may be controlled or limited by the second spring element 132.

In this embodiment, the first wheel or wheelset 150 is for rotation about an axis 152. In this embodiment, the spring assembly 100 comprises a connector 154 (shown as a ghosted representation in the Figures) that rigidly connects three points: the axis 152, a third pivot point 145 of the support structure 140, and a second end 135b of a linkage 135. The connector may be a wheel lever, or a trailing or leading arm. The linkage 135 has an opposite first end 135a pivotally connected to the first end portion 131a of the first spring element 131 at the loading point 120. In use, the load from the wheel 150 is applied to the loading point 120 via the connector 154 and the linkage 135.

Operation of the landing gear 10 and the right-hand (as illustrated) one of its spring assemblies 100 during a landing procedure will now be described, with reference to FIGS. 1 to 7. It will be appreciated that the left-hand (as illustrated) one of the spring assemblies 100 behaves in a corresponding manner to the right-hand spring assembly 100, but discussion thereof will be omitted for brevity.

In FIGS. 1 and 2, the landing gear 10 is shown without a load applied from or via the wheel 150 to the loading point 120. The landing gear 10 may for example be off the ground, such as attached to an airborne aircraft. The loading point 120 is therefore considered to have traveled zero distance from a reference point. This is represented on the graph of FIG. 7 by the origin of the graph. The second end portion 131b of the first spring element 131 abuts the first stop 141 of the support structure 140 due to the preload applied to the second end portion 131b of the first spring element 131 by the second spring element 132 via the link 133.

Figure 3:
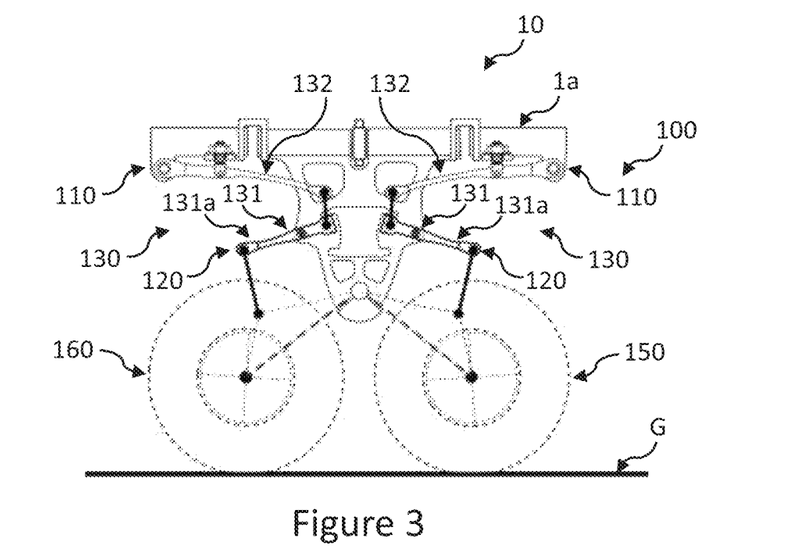
FIGS. 3 to 6 show successive schematic side views of the aircraft landing gear of FIG. 1 undergoing increasing loading.

During a landing procedure, a force from the ground G is transmitted as a load via the wheel 150, the connector 154, and the linkage 135 to the loading point 120. As shown in FIG. 3, this causes rotation of the axis 152 and the connector 154 about the third pivot point 145, bending of the first end portion 131a of the first spring element 131 at the spring rate of the first spring element 131, and thus travel of the loading point 120 relative to the interface 110 and from the reference point. However, a first moment about the first pivot 143 created by the application of the load to the loading point 120 from the wheel 150 is less than an opposing second moment about the first pivot 143 created by the application of the preload by the second spring element 132 via the link 133, and so the second end portion 131b of the first spring element 131 remains held in abutment with the first stop 141. A spring rate of the spring system 130 under these conditions is called herein the first spring rate $k_1$ of the spring system 130, and is depicted by the left-hand section of the line rising from the origin of the graph of FIG. 7. This first spring rate $k_1$ of the spring system 130 is preferably suitable for getting load onto the wheel 150 to help lessen or avoid skidding and to help improve braking drag.

As the load on the loading point 120 from the wheel 150 increases during the landing procedure, the first end portion 131a of the first spring element 131 continues to bend at the spring rate of the first spring element 131, and the loading point 120 continues to travel relative to the interface 110 and the reference point. The spring rate of the spring system 130 continues to be the first spring rate $k_1$.

Figure 4:
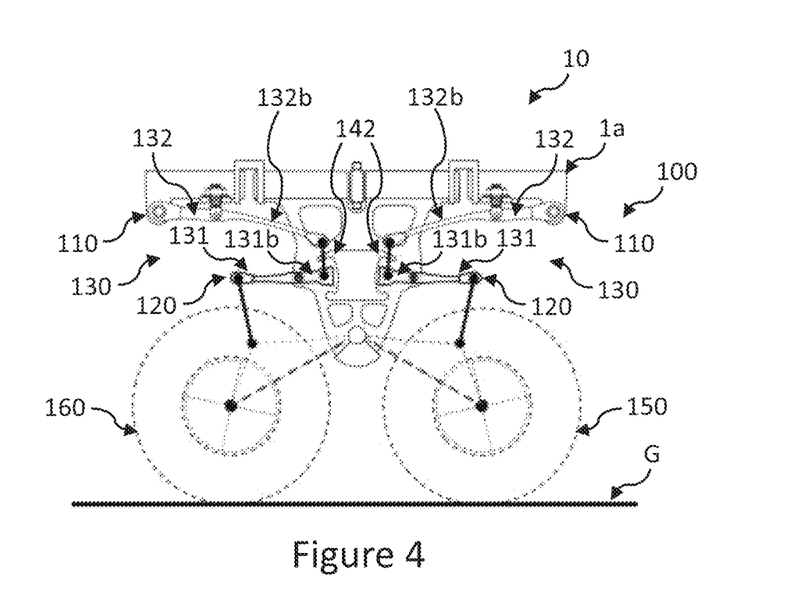

If, or when, the load on the loading point 120 from the wheel 150 increases to such an extent that the first moment about the first pivot 143 exceeds the second moment about the first pivot 143 created by the application of the preload, the first spring element 131 begins to rotate about the first pivot 143. This causes the second end portion 131b of the first spring element 131 to rotate away from the second stop 142 as shown in FIG. 4, causes bending of the second spring element 132, causes continued travel of the loading point 120 relative to the interface 110 and the reference point, and causes the first and second spring elements 131, 132 to begin acting in series. Due to the second spring element 132 having a lower or softer spring rate than the first spring element 131, the spring rate of the overall spring system 130 changes from the first spring rate $k_1$ to a second spring rate $k_2$, which is less than the first spring rate $k_1$, as depicted by the intermediate section of the line of the graph of FIG. 7. In other words, the spring rate seen by the loading point 120 reduces. This second, lower spring rate $k_2$ can help provide a soft ride characteristic.

If the load on the loading point 120 from the wheel 150 increases further during the landing procedure, the second spring element 132 continues to bend, the first spring element 131 continues to rotate about the first pivot 143, and the loading point 120 continues to travel relative to the interface 110 and the reference point. The spring rate seen by the loading point 120 during this motion remains at the lower, second spring rate $k_2$.

Figure 5:
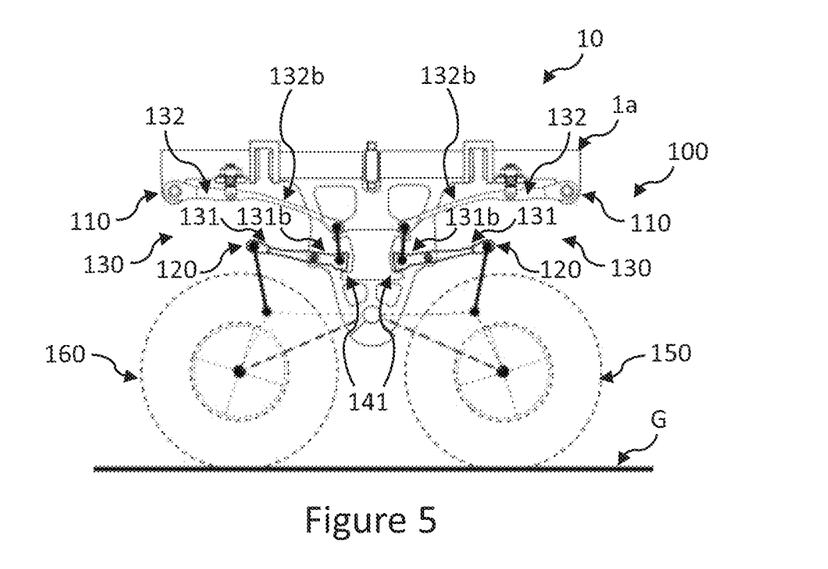
Figure 6:
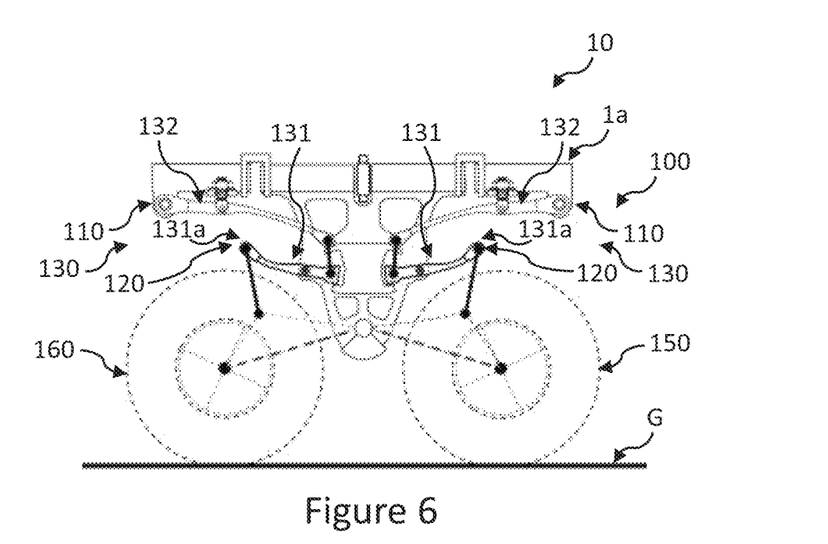

If the load on the loading point 120 from the wheel 150 increases sufficiently during the landing procedure, such as during a high-descent-rate landing, the second end portion 131b of the first spring element 131 will be rotated into contact with the first stop 141 of the support structure 140, as shown in FIG. 5. This abutment of the first spring element 131 and the first stop 141 prevents the first spring element 131 from rotating any further about the first pivot 143. In turn, this prevents the second spring element 132 from being bent any further. Accordingly, any further increase in the load on the loading point 120 from the wheel 150 causes bending of the first end portion 131a of the first spring element 131 at the spring rate of the first spring element 131, and continued travel of the loading point 120 relative to the interface 110, as shown in FIG. 6. The spring rate of the overall spring system 130 thus changes from the second spring rate $k_2$ to a third spring rate $k_3$, which is greater than the second spring rate $k_2$, as depicted by the right-hand section of the line of the graph of FIG. 7. In other words, the spring rate seen by the loading point 120 increases. This higher spring rate $k_3$ can help to react a high-descent-rate landing and/or may help to improve lateral stability when the aircraft to which the landing gear is mounted is taxiing or otherwise turning on the ground.

Figure 7:
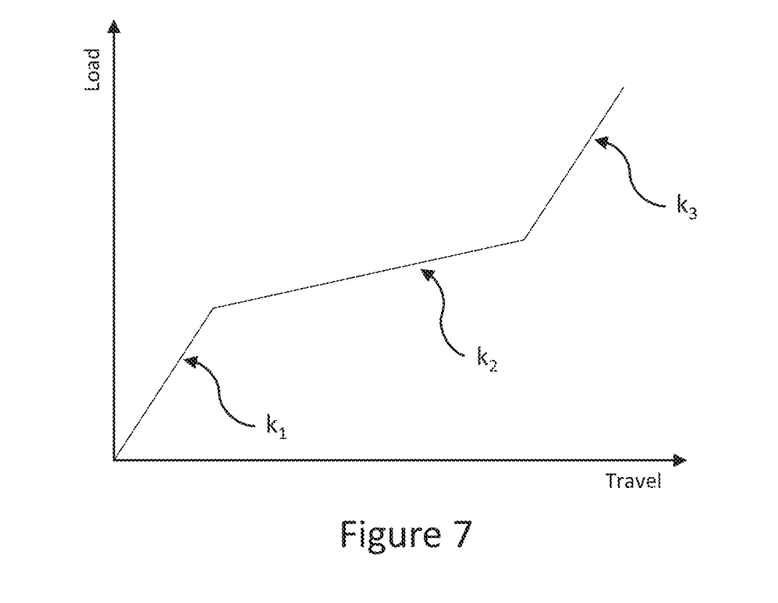
FIG. 7 shows a graph of load on a loading point of one of two spring assemblies of the aircraft landing gear of FIG. 1 versus travel of the loading point during a landing procedure.

In this embodiment, the third spring rate $k_3$ is equal, or substantially equal, to the first spring rate $k_1$, and hence the left- and right-hand sections of the line of the graph of FIG. 7 have equal gradients. This is due, at least in part, to the first spring element 131 being responsible for both. In some embodiments, the spring system may be configured so that the third spring rate $k_3$ is non-equal to the first spring rate $k_1$. That is, the third spring rate $k_3$ may be less than or greater than the first spring rate $k_1$. For example, one or more stops may be located adjacent the first spring element 131 to stiffen the spring characteristic of the first spring element 131 mid-travel. However, in any event, the third spring rate $k_3$ should be greater than the second spring rate $k_2$, such as to provide the benefits described above.

In some embodiments, the spring rate of the spring system 130 may not change from the second spring rate $k_2$ to a third, greater spring rate $k_3$ as the load applied to the loading point 120 is further increased. For example, one or more mechanical stops may be present to prevent further bending of the first end portion 131a of the first spring element 131 once the second end portion 131b of the first spring element 131 is in contact with the first stop 141 of the support structure 140.

Subsequently, if the load to the loading point 120 from the wheel 150 is reduced or removed, the resilient biasing force provided by the first and second spring elements 131, 132 drives the loading point 120 back towards the position shown in FIGS. 1 and 2.

Figure 8:
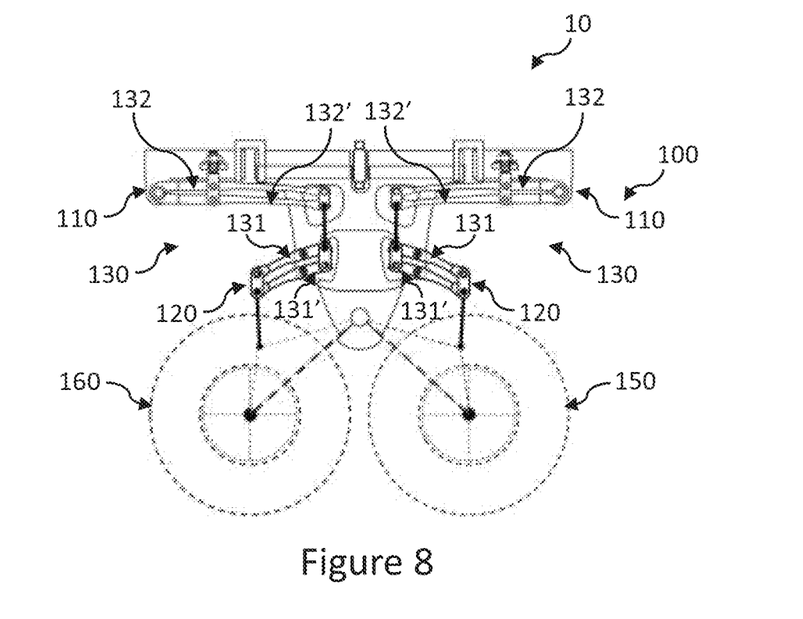
FIG. 8 shows a schematic cross-sectional side view of an example of an aircraft landing gear according to another embodiment of the present invention.

In a variation to the embodiment illustrated in FIGS. 1 to 6, the spring system 130 may comprise plural first spring elements 131, 131' and plural second spring elements 132, 132', wherein a combined spring rate of the plural second spring elements 132, 132' is less than a combined spring rate of the plural first spring elements 131, 131'. "Plural" could be two, as illustrated by way of example only in FIG. 8, or more than two. In other embodiments, the spring system 130 may comprise one first spring element 131 and plural second spring elements 132, 132', wherein a combined spring rate of the plural second spring elements 132, 132' is less than the spring rate of the first spring element 131. In still further embodiments, the spring system 130 may comprise plural first spring elements 131, 131' and one second spring element 132, wherein the spring rate of the second spring element 132 is less than the combined spring rate of the plural first spring elements 131, 131'.

The provision of plural first and/or second spring elements 131, 131', 132, 132' may lead to the spring system 130 having a degree of redundancy, in case of failure of any one of the spring elements. Additionally or alternatively, in some embodiments, each of the first and/or second spring elements 131, 131', 132, 132' may be identical components, and the number of components utilised as first spring elements and the number of components utilised as second spring elements are selected so that the spring rate (or combined spring rate) of the second spring element(s) is less than the spring rate (or combined spring rate) of the first spring element(s).

In some embodiments, one or more shock absorbers or dampeners may be incorporated into the spring assembly or suspension system to absorb or dampen shock impulses applied to the spring assembly or suspension system in use.

Figure 9:
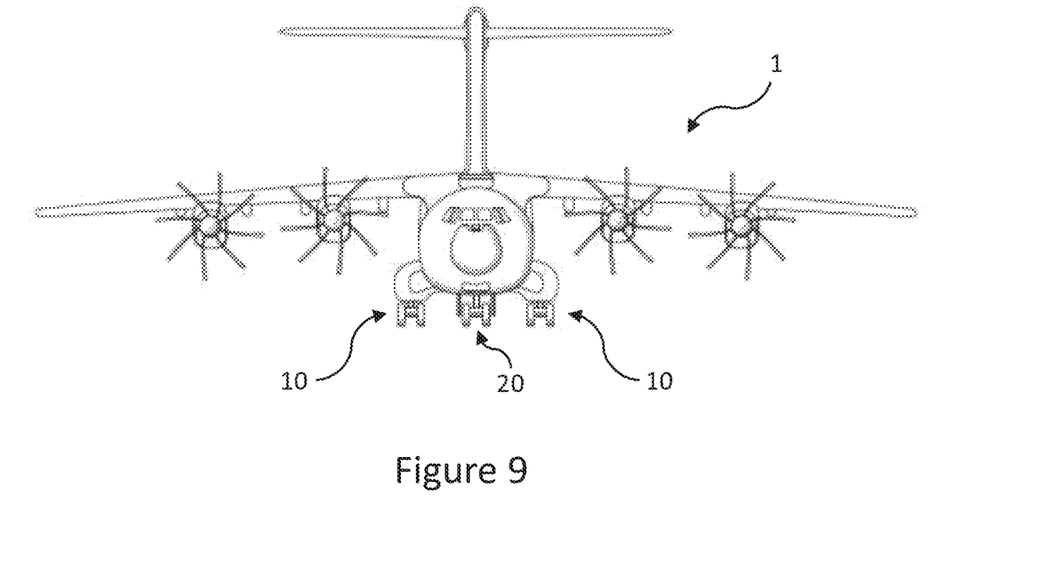
FIG. 9 shows a schematic front view of an example of an aircraft according to an embodiment of the present invention, the aircraft including a pair of the aircraft landing gear of FIG. 1.

FIG. 9 shows a schematic front view of an example of an aircraft 1 according to an embodiment of the present invention. The aircraft comprises a pair of main landing gears 10, each of which is as described above with reference to FIGS. 1 to 7. Each of the main landing gears 10 is body-mounted. However, in other embodiments, an aircraft may comprise main landing gears that are embodiments and wing-mounted. In a variation to the embodiment of the aircraft 1 shown in FIG. 9, the aircraft may comprise a pair of main landing gears that are each according to a different embodiment of the present invention, such as the landing gear shown in FIG. 8.

The aircraft 1 also comprises a nose landing gear 20. In some embodiments, the nose landing gear 20 may also be according to an embodiment of the present invention. In particular, in some embodiments, the nose landing gear 20 comprises a spring assembly or spring mechanism according to an embodiment of the present invention, such as a spring assembly or spring mechanism the same as or similar to that 100 described above with reference to FIGS. 1 to 7, or the same as or similar to that 100 described above with reference to FIG. 8.

It is to be noted that the term "or" as used herein is to be interpreted to mean "and/or", unless expressly stated otherwise.

The above embodiments are to be understood as non-limiting illustrative examples of how the present invention, and aspects of the present invention, may be implemented. Further examples of the present invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the present invention, which is defined in the accompanying claims.

The invention claimed is:

1. An aircraft landing gear spring assembly comprising:
   an interface via which the spring assembly is attachable to a support;
   a loading point configured to receive a load from one or more wheels or skids of a landing gear, wherein the loading point is movable relative to the interface; and
   a spring system configured to apply a resilient biasing force to the loading point to oppose movement of the loading point relative to the interface;
   wherein the spring system is configured so that, during application of an increasing load to the loading point against the resilient biasing force of the spring system, a spring rate of the spring system changes from a first spring rate to a second spring rate, the second spring rate being less than the first spring rate;
   wherein the spring system comprises a first spring element and a second spring element, a spring rate of the second spring element is less than a spring rate of the first spring element, and the loading point is connected to the second spring element via the first spring element.

2. The spring assembly of claim 1, wherein the spring system is configured so that, as the load applied to the loading point against the resilient biasing force of the spring system is further increased, the spring rate of the spring system changes from the second spring rate to a third spring rate, the third spring rate being greater than the second spring rate.

3. The spring assembly of claim 2, wherein the third spring rate is substantially equal to the first spring rate.

4. The spring assembly of claim 1, comprising a support structure,
   wherein the first spring element is rotationally mounted to the support structure at a first pivot between first and second end portions of the first spring element,
   wherein the first end portion of the first spring element comprises the loading point, and
   wherein the second end portion of the first spring element is coupled to the second spring element.

5. The spring assembly of claim 4, wherein the support structure has a first stop that is configured to limit rotation of the second end portion of the first spring element about the first pivot during application of the load to the loading point.

6. The spring assembly of claim 5, wherein the second spring element is configured to apply a preload to the second end portion of the first spring element to bias the second end portion of the first spring element away from the first stop.

7. The spring assembly of claim 5, wherein the support structure has a second stop, and wherein the first stop and the second stop are configured to limit an angular range of rotation of the second end portion of the first spring element about the first pivot.

8. The spring assembly of claim 1, wherein the first spring element comprises a leaf spring.

9. The spring assembly of claim 1, wherein the second spring element comprises a leaf spring.

10. An aircraft landing gear suspension system comprising:
    a loading point for receiving a load from one or more wheels or skids; and
    a spring mechanism including:
        a first leaf spring having a first end region connected to the loading point and a pivot point mounted to a support for an aircraft landing gear;
        a link connected to a second end region of the first leaf spring, wherein the pivot point of the first leaf spring is between the first and second end regions, and
        a second leaf spring having a first end region connected to an interface of the support for the aircraft landing gear, and a second end connected to the link;
    wherein a spring rate of the second leaf spring is less than a spring rate of the first leaf spring, and wherein the spring mechanism is configured so that, during application of an increasing load to the loading point, a spring rate of the spring mechanism changes from a first spring rate to a second spring rate and then to a third spring rate, the second spring rate being less than each of the first and third spring rates.

11. A kit of parts for assembling into the spring assembly of claim 1.

12. Aircraft landing gear comprising at least one spring assembly according to claim 1.

13. An aircraft comprising at least one aircraft landing gear according to claim 12.

14. A method of operating a landing gear spring assembly, the spring assembly including an interface connecting the spring assembly to a support in an aircraft, and a spring system configured to apply a resilient biasing force to a loading point, the loading point configured to receive a load from one or more wheels or skids of a landing gear, wherein the spring system comprises a first spring element and a second spring element, wherein a spring rate of the second spring element is less than a spring rate of the first spring element, and wherein the loading point is connected to the second spring element via the first spring element, the method comprising:
    applying an increasing load from a wheel or from a skid of the landing gear to the loading point of the spring assembly, wherein the loading point is movable relative to the interface;
    applying, by the spring system, a resilient biasing force to the loading point to oppose movement of the loading point relative to the interface; and
    during application of the increasing load to the loading point and the application of the resilient biasing force, changing a spring rate of the spring system from a first spring rate to a second spring rate, wherein the second spring rate is less than the first spring rate.

* * * * *